(12) United States Patent
Katayama et al.

(10) Patent No.: US 10,300,802 B2
(45) Date of Patent: May 28, 2019

(54) CHARGING SYSTEM AND CHARGING START CONTROL METHOD

(71) Applicant: NICHICON CORPORATION, Kyoto-shi, Kyoto (JP)

(72) Inventors: Yuki Katayama, Kyoto (JP); Ryosuke Koguchi, Kyoto (JP); Hiroyuki Sumimura, Kyoto (JP); Masaya Nishi, Kyoto (JP)

(73) Assignee: NICHICON CORPORATION, Kyoto-shi, Kyoto (JP)

( * ) Notice: Subject to any disclaimer, the term of this patent is extended or adjusted under 35 U.S.C. 154(b) by 253 days.

(21) Appl. No.: 15/327,392

(22) PCT Filed: Jun. 21, 2016

(86) PCT No.: PCT/JP2016/068419
§ 371 (c)(1),
(2) Date: Jan. 19, 2017

(87) PCT Pub. No.: WO2016/208589
PCT Pub. Date: Dec. 29, 2016

(65) Prior Publication Data

US 2017/0182902 A1   Jun. 29, 2017

(30) Foreign Application Priority Data

Jun. 25, 2015 (JP) .................. 2015-127865

(51) Int. Cl.
*B60L 11/18*     (2006.01)
*H02J 7/00*      (2006.01)
(Continued)

(52) U.S. Cl.
CPC .......... *B60L 11/1825* (2013.01); *B60L 50/50* (2019.02); *B60L 53/14* (2019.02); *B60L 53/31* (2019.02);
(Continued)

(58) Field of Classification Search
None
See application file for complete search history.

(56) References Cited

U.S. PATENT DOCUMENTS 9,007,022 B2 * 4/2015 Ohkuma ............... B60L 11/185
                                                  320/104
9,421,878 B2 * 8/2016 Tremblay ............. H01R 13/447
                     (Continued)

FOREIGN PATENT DOCUMENTS

EP      2 738 735 A1    6/2014
JP     H 11-266509 A    9/1999
                     (Continued)

OTHER PUBLICATIONS

Extended European Search Report for European Application No. 16814359.2 dated Apr. 26, 2018—English translation.

*Primary Examiner* — Chico A Foxx
(74) *Attorney, Agent, or Firm* — Muncy, Geissler, Olds & Lowe, P.C.

(57) ABSTRACT

A charging system 1 including a charging apparatus 10 and a data base 20, the charging apparatus 10 including a power supply unit 11, a control unit 12, and a plurality of charging connectors 13-1 to 13-3 compliant with different charging standards. When authentication of identification information succeeds, the control unit 12 determines a charging standard on the basis of vehicle information of the data base 20 and when the authentication of the identification information fails, determines a charging standard on the basis of vehicle information input by a user. Further, the control unit 12 unlocks a charging connector compliant with the determined charging standard and notifies of unlocking.

11 Claims, 5 Drawing Sheets

(51) Int. Cl.
  *G05B 15/02* (2006.01)
  *B60L 50/50* (2019.01)
  *B60L 53/14* (2019.01)
  *B60L 53/31* (2019.01)
  *B60L 53/65* (2019.01)

(52) U.S. Cl.
  CPC .............. *B60L 53/65* (2019.02); *G05B 15/02* (2013.01); *H02J 7/00* (2013.01); *H02J 7/0045* (2013.01); *Y02T 10/7005* (2013.01)

(56) References Cited

U.S. PATENT DOCUMENTS

| | | | | |
|---|---|---|---|---|
| 2002/0072964 A1* | 6/2002 | Choi | ............... | G06Q 30/04 |
| | | | | 705/13 |
| 2012/0007554 A1* | 1/2012 | Kanamori | ............ | H01M 10/44 |
| | | | | 320/109 |
| 2012/0239571 A1* | 9/2012 | Boot | ................. | B60L 11/1816 |
| | | | | 705/44 |
| 2012/0274275 A1* | 11/2012 | Baek | ........................ | H02J 5/00 |
| | | | | 320/109 |
| 2014/0055091 A1* | 2/2014 | Kondo | ................. | G07F 15/005 |
| | | | | 320/109 |
| 2014/0207498 A1* | 7/2014 | Cho | ....................... | G06Q 10/02 |
| | | | | 705/5 |
| 2014/0266042 A1 | 9/2014 | Storm | | |
| 2014/0333128 A1* | 11/2014 | Ichikawa | ................ | H02J 7/025 |
| | | | | 307/9.1 |
| 2016/0075249 A1* | 3/2016 | Grabar | ............... | B60L 11/1846 |
| | | | | 320/108 |
| 2018/0215280 A1* | 8/2018 | Lee | .................... | B60L 11/1816 |

FOREIGN PATENT DOCUMENTS

| | | |
|---|---|---|
| JP | 2010-028913 A | 2/2010 |
| JP | 2012-023825 A | 2/2012 |
| JP | 2012-055115 A | 3/2012 |
| JP | 2014-183739 A | 9/2014 |
| JP | 2015-049851 A | 3/2015 |
| WO | WO 2012/099214 A1 | 7/2012 |

* cited by examiner

CHARGING SYSTEM AND CHARGING START CONTROL METHOD

TECHNICAL FIELD

The present invention relates to a charging system capable of charging a plurality of electric vehicles of different charging standards, and a charging start control method of the charging system.

BACKGROUND ART

Conventionally known charging apparatus is recited in, for example, Patent Document 1, which is capable of charging a plurality of electric vehicles compliant with different charging standards (charging protocols). The charging apparatus recited in Patent Document 1 includes a charging connector compliant with the SAE standard, a charging connector compliant with the CHAdeMO standard, and a selection switch for a user to select one of the SAE standard and the CHAdeMO standard and unlock the charging connector compliant with the selected charging standard. Accordingly, this charging apparatus enables a CHAdeMO standard-compliant electric vehicle and a SAE standard-compliant electric vehicle to be charged by one apparatus.

PRIOR ART DOCUMENT

Patent Document

Patent Document 1: JP-A-2014-183739

SUMMARY OF THE INVENTION

Problems to be Solved by the Invention

However, the above conventional charging apparatus requires a user to select a charging standard each time to not only make operation complicated but also possibly invite erroneous selection of a charging standard, and in such a case, no charging is allowed to make the user feel inconvenience.

Additionally, with the above conventional charging apparatus, a user cannot find which charging connector is unlocked in some cases, and in such a case, the user may feel inconvenience. In this case, a charging connector might be damaged when the user forcedly pulls out a locked charging connector.

The present invention has been made in view of the above circumstances and aims to provide a charging system with improved convenience and a charging start control method of the charging system.

Means for Solving the Problems

In order to solve the problems, a charging system according to the present invention is a charging system including a charging apparatus which charges a plurality of electric vehicles compliant with different charging standards, and a data base in which identification information for identifying a user of the charging apparatus and vehicle information related to the user's electric vehicle are stored so as to be associated with each other, in which the charging apparatus includes a charging apparatus main body including a power supply unit and a control unit, the power supply unit conducting charging operation under the control of the control unit; and a plurality of charging connectors compliant with different charging standards which is switched between a state of being locked in the charging apparatus main body and an unlocked state under the control of the control unit, the control unit executing reception processing of receiving an input of the identification information from a user; authentication processing of communicating with the data base to conduct authentication of the identification information input in the reception processing; first determination processing of determining a charging standard on the basis of the vehicle information associated with the identification information when the authentication succeeds; and unlocking/notification processing of unlocking a charging connector compliant with a charging standard determined by the first determination processing among the plurality of charging connectors and notifying of unlocking so as to allow the user to identify the unlocked charging connector.

According to this configuration, since the control unit of the charging apparatus determines a charging standard on the basis of the vehicle information, such inconvenience can be eliminated as a failure of charging because of user's erroneous selection of a charging standard. Additionally, according to this configuration, since the control unit notifies of unlocking so as to allow the user to identify an unlocked charging connector, such inconvenience can be eliminated as prevents the user from finding which of the charging connectors is unlocked.

In the charging system, the control unit executes second determination processing of receiving an input of the vehicle information from a user and determining a charging standard on the basis of the input vehicle information when the authentication fails in the authentication processing, and in the unlocking/notification processing, unlocks a charging connector compliant with a charging standard determined by the first determination processing or by the second determination processing among the plurality of charging connectors, and notifies of unlocking so as to allow the user to identify the unlocked charging connector.

According to this configuration, since execution of the second determination processing by the control unit eliminates a need for a user to select a charging standard even when authentication fails, such inconvenience can be eliminated as a failure of charging because of user's erroneous selection of a charging standard.

In the charging system, the control unit can be configured to acquire, in the second determination processing, the vehicle information by communication with a user's electric vehicle or acquire the vehicle information by notifying the user of the vehicle information of each of the plurality of electric vehicles to cause the user to select one from the vehicle information.

According to this configuration, when vehicle information is acquired by communication with an electric vehicle, a user's effort to input the vehicle information can be completely saved, and even when the vehicle information is acquired by selection by a user, notifying the user of vehicle information of each of a plurality of electric vehicles saves a user's effort.

In the charging system, the control unit can be configured to execute selection processing of causing a user to select a need of change/no need of change of the vehicle information acquired in the first determination processing or in the second determination processing, and when the user selects no need of change, notify the data base of an update of the vehicle information and when the user selects a need of change, execute the second determination processing.

According to this configuration, even when vehicle information stored in the data base and vehicle information related to a user's current electric vehicle are different from each other, such as a case where the user changes vehicles, a charging standard can be properly determined.

In the charging system, the control unit can be configured to notify the data base of a charging start when causing the power supply unit to start the charging operation, and the data base can be configured to, when receiving the update notification and the charging start notification from the control unit, update the vehicle information associated with the identification information or store the notified vehicle information so as to be associated with the identification information.

According to this configuration, an update or storage of unnecessary information such as vehicle information related to an electric vehicle whose charging cannot be started can be prevented.

In the charging system, the charging apparatus can be configured to include input receiving means which receives an input of the identification information and the vehicle information from a user and outputs the input identification information and the input vehicle information to the control unit; and lighting means which lights under the control of the control unit for allowing the user to visually identify the unlocked charging connector.

The charging system can be configured to include a portable information terminal which a user carries, in which the control unit receives an input of the identification information and/or the vehicle information from the portable information terminal to notify the portable information terminal of the unlocking.

According to this configuration, a user is allowed to input identification information and/or vehicle information and to receive a notification of unlocking while sitting in an electric vehicle.

The charging system can be configured to include a vehicle-mounted information terminal mounted on a user's electric vehicle, in which the control unit receives an input of the identification information and/or the vehicle information from the vehicle-mounted information terminal to notify the vehicle-mounted information terminal of the unlocking.

According to this configuration, a user is allowed to input identification information and/or vehicle information and to receive a notification of unlocking while sitting in an electric vehicle.

In the charging system, the plurality of charging connectors can be configured to include a plurality of charging connectors for one charging standard, and the control unit can be configured, to, in the unlocking/notification processing, unlock the plurality of charging connectors compliant with a charging standard determined by the first determination processing or by the second determination processing.

According to this configuration, since a plurality of charging connectors is included for one charging standard, an operating rate of the charging apparatus can be increased. Additionally, according to this configuration, since a plurality of charging connectors is unlocked, a user, when selecting a charging connector, is allowed to have a wider range of selection including, for example, selection of a charging connector located closest to a parking position.

In order to solve the problems, the charging start control method according to the present invention is a charging start control method of a charging system including a charging apparatus having a plurality of charging connectors compliant with different charging standards to charge a plurality of electric vehicles compliant with different charging standards, and a data base in which identification information for identifying a user of the charging apparatus and vehicle information related to the user's electric vehicle are stored so as to be associated with each other, the method including steps, which are conducted by the charging apparatus, of a reception step of receiving an input of the identification information from a user; an authentication step of communicating with the data base to conduct authentication of the identification information input in the reception step; a first determination step of determining a charging standard on the basis of the vehicle information associated with the identification information when the authentication succeeds; and an unlocking/notification step of switching a charging connector compliant with a charging standard determined by the first determination step among the plurality of charging connectors from a locked state to an unlocked state and notifying of unlocking so as to allow the user to identify the unlocked charging connector.

According to this configuration, since the charging apparatus determines a charging standard on the basis of the vehicle information, such inconvenience can be eliminated as a failure of charging because of user's erroneous selection of a charging standard. Additionally, according to this configuration, since the charging apparatus notifies of unlocking so as to allow the user to identify an unlocked charging connector, such inconvenience can be eliminated as prevents the user from finding which of the charging connectors is unlocked.

The charging start control method preferably further includes a second determination step, which is conducted by the charging apparatus, of receiving an input of the vehicle information from a user and determining a charging standard on the basis of the input vehicle information when the authentication fails in the authentication step, in which in the unlocking/notification step, the charging apparatus switches a charging connector compliant with a charging standard determined by the first determination step or by the second determination step among the plurality of charging connectors from the locked state to the unlocked state and notifies of unlocking so as to allow the user to identify the unlocked charging connector.

According to this configuration, since further including the second determination step eliminates a need for a user to select a charging standard even when authentication fails, such inconvenience can be eliminated as a failure of charging because of user's erroneous selection of a charging standard.

Effect of the Invention

According to the present invention, a charging system with improved convenience and a charging start control method of the charging system can be provided.

MODE FOR CARRYING OUT THE INVENTION

In the following, description will be made of an embodiment of a charging system and a charging start control method of the charging system according to the present invention.

[Charging System]

Figure 1:
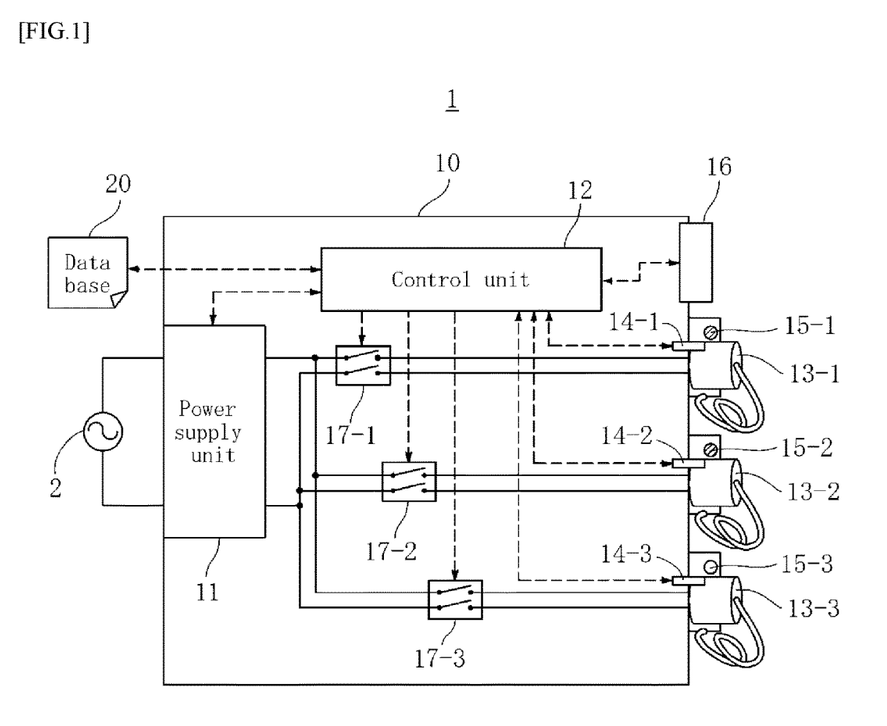
FIG. 1 is a block diagram showing a configuration of a charging system according to the present invention.

FIG. 1 shows a charging system 1 according to one embodiment of the present invention. The charging system 1 includes a charging apparatus 10 which conducts charging (quick charging) of a plurality of electric vehicles complaint with different charging standards, and a data base (storage device) 20.

The data base 20 stores identification information related to a user of the charging apparatus 10 and vehicle information related to the user's electric vehicle so as to be associated with each other. The identification information includes information enabling identification of a user of the charging apparatus 10, e.g. a user ID of a user's authentication card, a one-time password of which a user is notified in advance and the like. The vehicle information includes a charging standard of an electric vehicle and/or information enabling the charging standard to be identified, e.g. information about a manufacturer, a type of car, a storage capacity, charging pattern and the like.

Before starting using the charging apparatus 10, e.g. when purchasing an electric vehicle, the user is allowed to store identification information and vehicle information in the data base 20 via the Internet in advance. Additionally, though details will be described later, when the identification information and the vehicle information are stored in the data base 20, the charging apparatus 10 is allowed to update at least the vehicle information after the start of the charging. By contrast, when neither the identification information nor the vehicle information is stored in the data base 20, the charging apparatus 10 is allowed to store the identification information and the vehicle information so as to be associated with each other in the data base 20 after the start of charging. In the present embodiment, although the data base 20 is provided separately from the charging apparatus 10, the data base 20 may be provided inside the charging apparatus 10.

The charging apparatus 10 includes a charging apparatus main body including a power supply unit 11 and a control unit 12, three charging connectors (charging guns) 13-1 to 13-3 compliant with different charging standards, locking mechanisms 14-1 to 14-3 which lock the charging connectors 13-1 to 13-3 in a gun holder of the charging apparatus main body, lighting means 15-1 to 15-3 provided adjacent to the locking mechanisms 14-1 to 14-3, and input receiving means 16 which receives input information from a user.

The power supply unit 11 generates DC power on the basis of AC power supplied from an alternating current source 2 and supplies the generated DC power to the charging connectors 13-1 to 13-3 via a power line. In other words, the three charging connectors 13-1 to 13-3 compliant with different charging standards receive a supply of DC power from the single power supply unit 11. The power supply unit 11 includes at least one charging unit. The charging unit includes, for example, an AC/DC converter, and a control circuit which controls the AC/DC converter under the control of the control unit 12.

On the power line which connects the power supply unit 11 and the charging connector 13-1, a relay 17-1 is interposed. Additionally, on the power line which connects the power supply unit 11 and the charging connector 13-2, a relay 17-2 is interposed, and on the power line which connects the power supply unit 11 and the charging connector 13-3, a relay 17-3 is interposed. These relays 17-1 to 17-3 are independently switched between an on-state and an off-state under the control of the control unit 12. For example, the relay 17-1 is turned off at a time of non-charging and is turned on at a time of charging (specifically, when locking by the locking mechanism 14-1 is released to be connected to an electric vehicle). This is also the case with the relays 17-2 and 17-3.

The charging connectors 13-1 to 13-3 are compliant with a plurality of charging standards. Specifically, the charging connectors 13-1 and 13-2 are compliant with a first charging standard A (e.g. the CHAdeMO standard) and the charging connector 13-3 is compliant with a second charging standard B (e.g. the SAE standard). Since the charging connectors 13-1 to 13-3 are locked in the charging apparatus main body by the locking mechanisms 14-1 to 14-3 at the time of not charging, the connectors cannot be connected to an electric vehicle. By contrast, when entering an unlocked state, the charging connectors 13-1 to 13-3 can be connected to the electric vehicle. For example, when the charging connectors 13-1 and 13-2 compliant with the first charging standard A enter the unlocked state, the user selects one of the charging connectors 13-1 and 13-2 to be connected to the electric vehicle.

Figure 2:
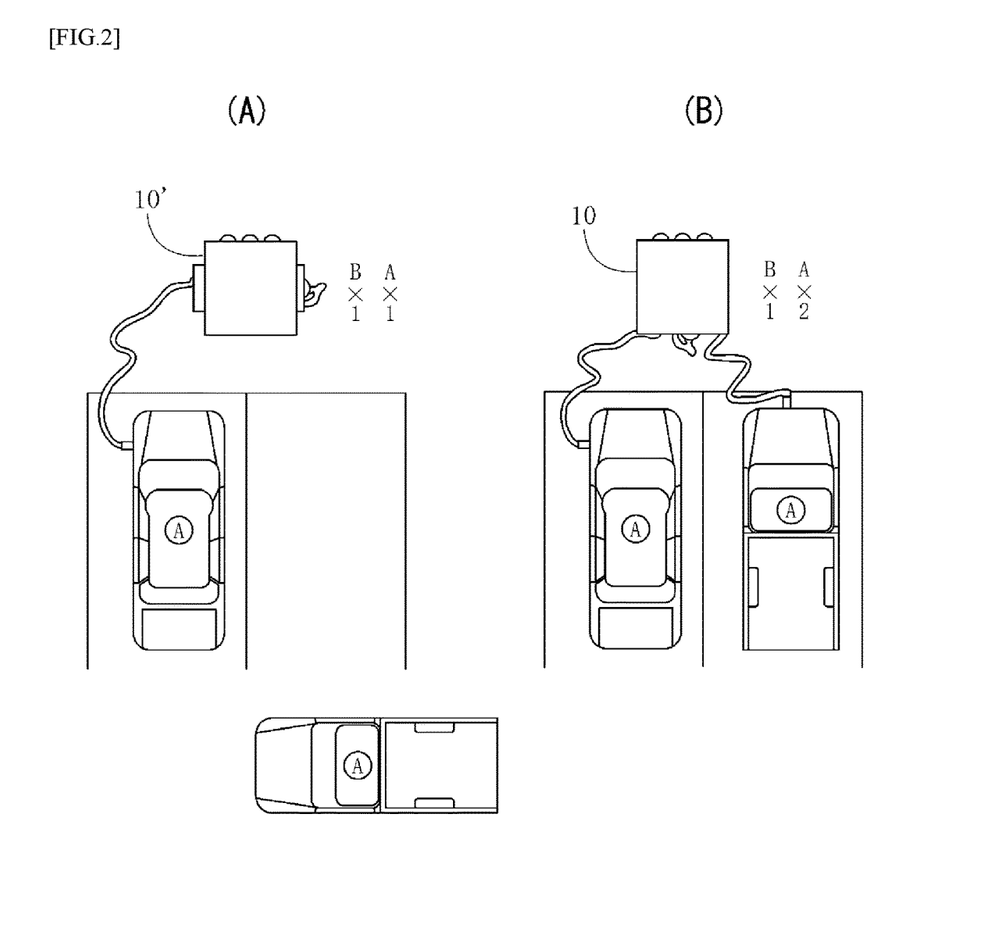
FIG. 2 is a view for explaining usefulness of including a plurality of charging connectors for one charging standard.

Here, with reference to FIGS. 2(A) and 2(B), description will be made of usefulness of including a plurality of charging connectors for one charging standard. FIG. 2(A) shows a charging apparatus 10' including one charging connector compliant with the first charging standard A and one charging connector compliant with the second charging standard B. FIG. 2(B) shows the charging apparatus 10 including two charging connectors compliant with the first charging standard A and one charging connector compliant with the second charging standard B. Since the charging apparatus 10' shown in FIG. 2(A) includes only one charging connector compliant with the first charging standard A, when there are two electric vehicles compliant with the first charging standard A, one electric vehicle cannot be charged even through there is free space for charging. By contrast, since the charging apparatus 10 shown in FIG. 2(B) includes two charging connectors 13-1 and 13-2 compliant with the first charging standard A, when there is free charging space, the two electric vehicles compliant with the first charging standard A can be both charged. In other words, as compared with the charging apparatus 10' shown in FIG. 2(A), the charging apparatus 10 shown in FIG. 2(B) has an increased operating rate. Further, with the charging apparatus 10, when selecting the charging connector 13-1 or 13-2, the user is allowed to have a wider range of selection such as selection of a connector closer to a parking position, for example.

Again, with reference to FIG. 1, the lighting means 15-1 to 15-3 continuously or intermittently light under the control of the control unit 12 for allowing a user to visually identify which of the charging connectors 13-1 to 13-3 is unlocked. In FIG. 1, since the two charging connectors 13-1 and 13-2 compliant with the first charging standard A are unlocked and the charging connector 13-3 compliant with the second charging standard B is locked, the lighting means 15-1 and 15-2 light, while the lighting means 15-3 does not light. The lighting means 15-1 to 15-3 each include, for example, an LED which emits a visible light. Although the lighting means 15-1 to 15-3 are preferably provided in the vicinity of the corresponding charging connectors 13-1 to 13-3, a position for disposition can be appropriately changed as long as a user can identify an unlocked connector.

The input receiving means 16, which has a display screen, receives an input of the identification information and the vehicle information from a user on the display screen and outputs the input identification information and vehicle information to the control unit 12. Specifically, when the user holds an authentication card over the input receiving means 16, the input receiving means 16 reads a user ID of the authentication card from the authentication card and outputs the read user ID to the control unit 12. The input receiving means 16 includes a liquid crystal touch panel, for example.

The control unit 12 communicates with the data base 20 via the Internet (e.g. Ethernet (registered trademark)). Additionally, the control unit 12 communicates with each unit of the charging apparatus 10 via, for example, a CAN communication line.

Additionally, at a time of charging start control, the control unit 12 executes:

(1) reception processing of receiving an input of identification information from the user via the input receiving means 16;

(2) authentication processing of communicating with the data base 20 to conduct authentication of the identification information input in the reception processing;

(3) first determination processing of determining a charging standard on the basis of vehicle information associated with the identification information when the authentication succeeds; and (4) unlocking/notification processing of unlocking usable charging connector(s) 13-1 to 13-3, which is/are the charging connector(s) 13-1 to 13-3 compliant with the charging standard determined by the first determination processing among the charging connectors 13-1 to 13-3 and notifying of unlocking by the lighting means 15-1 to 15-3 so that a user can identify the unlocked charging connector(s) 13-1 to 13-3.

Here, when the authentication fails, although the charging apparatus 10 needs not unlock the charging connectors 13-1 to 13-3, an input of vehicle information from a user may be allowed in consideration of user's convenience. Specifically, the control unit 12 may execute second determination processing of receiving an input of vehicle information from a user and on the basis of the input vehicle information, determining a charging standard, and in the unlocking/notification processing, may unlock usable charging connector(s) 13-1 to 13-3, which is/are the charging connector(s) 13-1 to 13-3 compliant with the charging standard determined by the first determination processing or by the second determination processing among the charging connectors 13-1 to 13-3 and notify of unlocking by the lighting means 15-1 to 15-3 so that a user can identify the unlocked charging connector(s) 13-1 to 13-3.

Further, the control unit 12 executes:

(5) selection processing of causing a user to select, by the input receiving means 16, whether to change or not the vehicle information acquired in the first determination processing or the second determination processing; and (6) updating processing of causing the data base 20 to update or newly store vehicle information by notifying, when, in the selection processing, a user selects change unneeded, the data base 20 of an update of the vehicle information and at the time of causing the power supply unit 11 to start charging operation, notifying the data base 20 of charging start. More detailed description of the processing will be made later.

The charging system 1 according to the present embodiment eliminates such inconvenience as a failure of charging because of user's erroneous selection of a charging standard because the control unit 12 determines a charging standard on the basis of the vehicle information. Additionally, because the control unit 12 notifies of unlocking by the lighting means 15-1 to 15-3 so that a user can identify the unlocked charging connector(s) 13-1 to 13-3, the charging system 1 according to the present embodiment eliminates such inconvenience as prevents the user from finding which of the charging connectors 13-1 to 13-3 is unlocked, thereby preventing excessive pull-out of the charging connectors 13-1 to 13-3 which is a cause of a failure.

[Charging Start Control Method]

Figure 3:
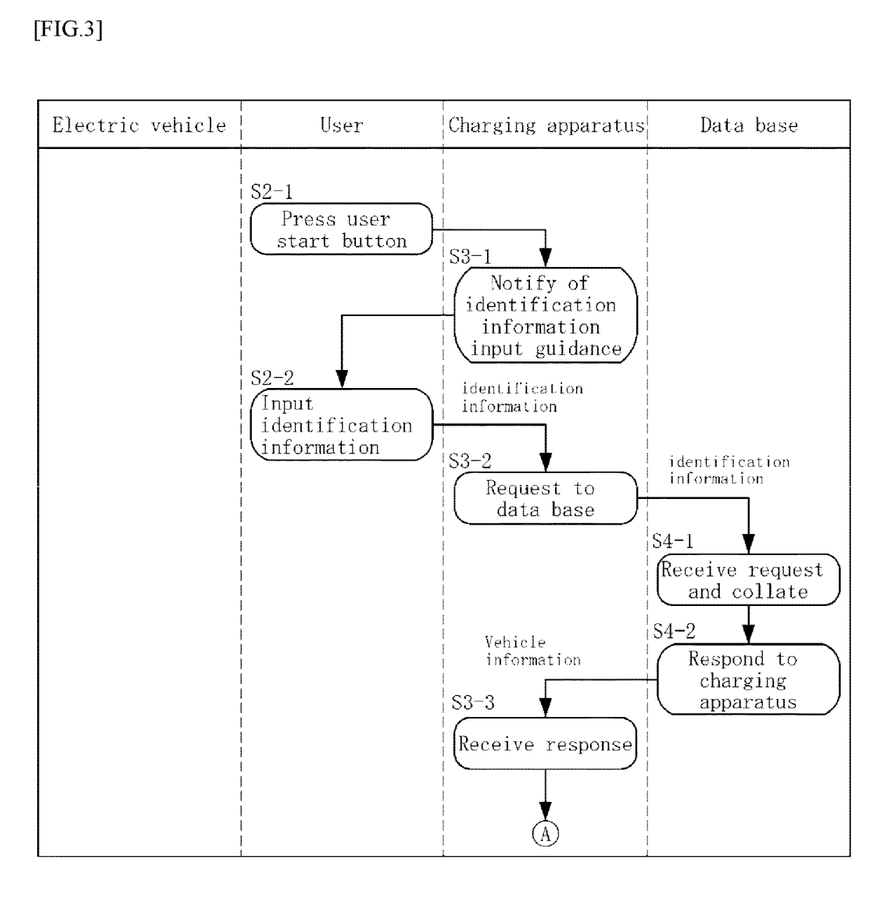
FIG. 3 is a flow chart of a charging start control method according to the present invention.
Figure 4:
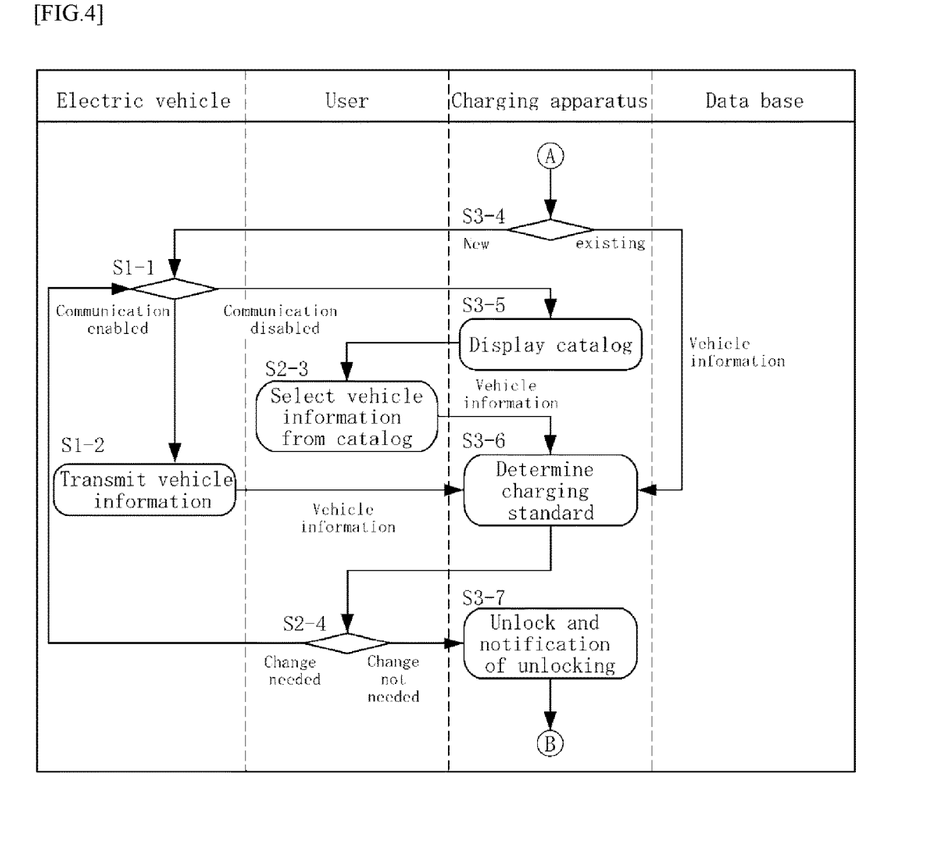
FIG. 4 is a flow chart of the charging start control method according to the present invention subsequent to that of FIG. 3.
Figure 5:
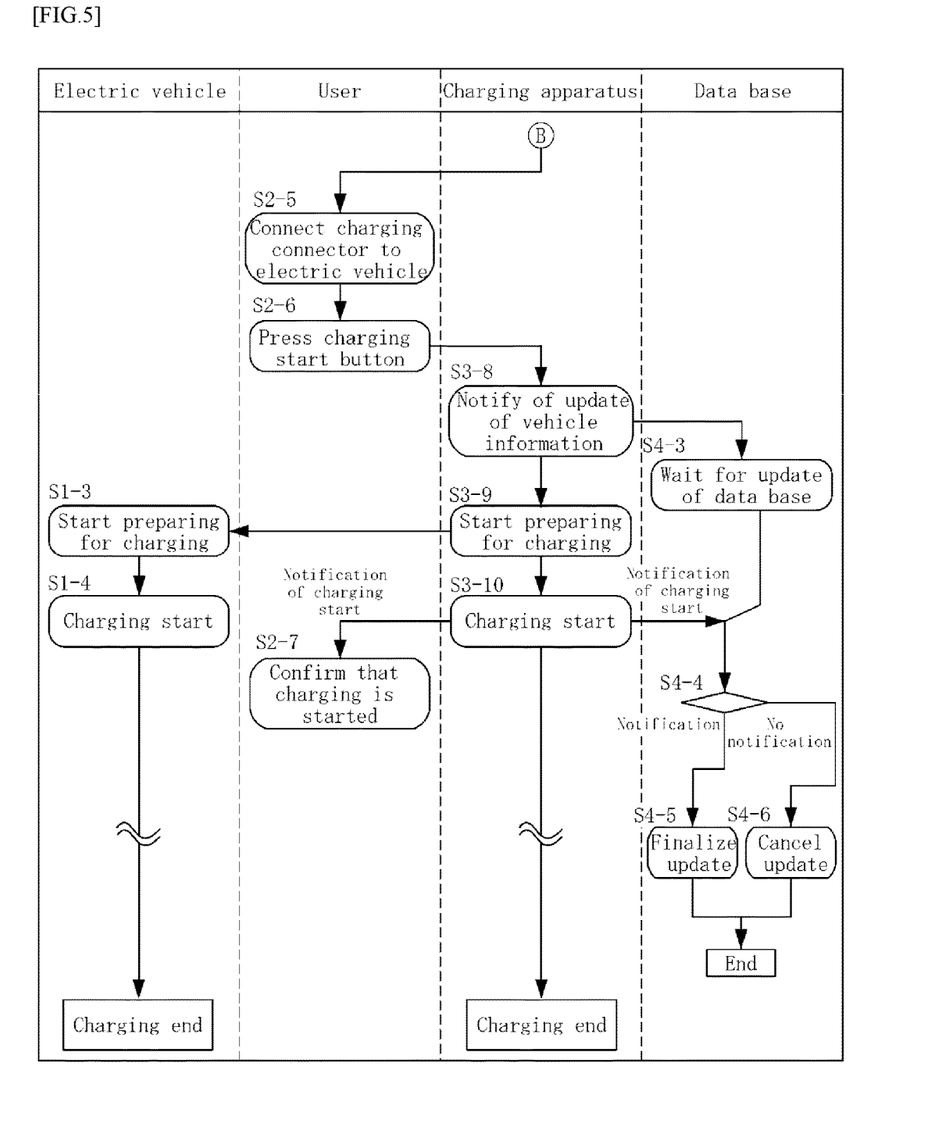
FIG. 5 is a flow chart of the charging start control method according to the present invention subsequent to that of FIG. 4.

FIG. 3 to FIG. 5 show flow charts of a charging start control method according to one embodiment of the present invention. The charging start control method according to the present embodiment is executed by the charging system 1.

As shown in FIG. 3, when a user start button provided in the charging apparatus 10 is pressed by the user (S2-1), the control unit 12 causes the input receiving means 16 to display an input screen for identification information, thereby notifying the user of identification information input guidance (S3-1). Specifically, the control unit 12 causes the input receiving means 16 to display a read screen for an authentication card (e.g. an authentication card using RFIC) and an input screen for a one-time password.

When the user inputs the identification information in the input receiving means 16 (S2-2), the input receiving means 16 outputs the input identification information to the control unit 12. In a case where the user's electric vehicle is compliant with the first charging standard A and the user has an authentication card, when the user holds the authentication card over the input receiving means 16, the input receiving means 16 reads a user ID of the authentication card to output the read user ID to the control unit 12. On the other hand, in a case where the user's electric vehicle is compliant with the second charging standard B and the user is notified of a one-time password in advance, when the user inputs the one-time password, the input receiving means 16 outputs the input one-time password to the control unit 12. The processing from the above S3-1 to the processing in which the identification information is input to the control unit 12 corresponds to the reception processing and corresponds to the reception step of the charging start control method. The control unit 12 may notify of payment of a charging fee together with a notification of identification information input guidance, and in such a case, the user will input the identification information, as well as paying a charging fee.

The control unit 12 having received the input of the identification information outputs the input identification information to the data base 20, as well as requesting the data base 20 to collate the identification information (S3-2). In other words, the control unit 12 starts authentication of the input identification information.

The data base 20 having received the collation request starts collation of the identification information (S4-1) and responds to the control unit 12 with a collation result (S4-2). Specifically, when identification information coincident with the input identification information (a user ID or a one-time password) is stored, the data base 20 outputs vehicle information associated with the identification information to the control unit 12. By contrast, when no identification information coincident with the input identification information is stored, the data base 20 outputs, to the control unit 12, a signal indicating that no identification information is coincident with the input identification information. The control unit 12 receives the collation result from the data base 20 (S3-3).

As shown in FIG. 4, the control unit 12 having received the collation result determines whether the input identification information is "new" or "existing" on the basis of the collation result (S3-4). When no vehicle information is input from the data base 20, the control unit 12 determines that the identification information is "new" (new at S3-4), and when vehicle information is input from the data base 20, determines that the identification information is "existing" (existing at S3-4). Determination of "new" by the control unit 12 corresponds to a failure of authentication, and determination of "existing" by the control unit 12 corresponds to a success of authentication. Additionally, the processing of the above S3-2 to S3-4 corresponds to the authentication processing and corresponds to the authentication step of the charging start control method.

The control unit 12 having made a determination of "new" tries to communicate with a user's electric vehicle by wireless in order to acquire vehicle information. When the electric vehicle fails to have a function of communicating with the control unit 12 by wireless (communication disabled at S1-1), the control unit 12, which cannot acquire vehicle information from the electric vehicle, causes the input receiving means 16 to display a vehicle information selection screen (e.g. a catalog of electric vehicles) to notify the user of vehicle information of each of a plurality of electric vehicles (S3-5).

When vehicle information is selected by the user in the input receiving means 16 (S2-3) and the vehicle information is input from the input receiving means 16 to the control unit 12, the control unit 12 determines a charging standard of the charging connector(s) 13-1 to 13-3 to be unlocked on the basis of the input vehicle information (S3-6). When the vehicle information includes a charging standard, the control unit 12 sets the charging standard as a charging standard of the charging connector(s) 13-1 to 13-3 to be unlocked. On the other hand, even if the vehicle information fails to include a charging standard, when vehicle information other than a charging standard is stored in the control unit 12 so as to be associated with a charging standard, the control unit 12 is allowed to determine a charging standard of the charging connector(s) 13-1 to 13-3 to be unlocked. For example, even if vehicle information related to a manufacturer and a type of car is input, when a manufacturer and a type of car are stored in the control unit 12 so as to be associated with a charging standard, the control unit 12 is allowed to determine a charging standard.

Additionally, when an electric vehicle has the function of communicating with the control unit 12 by wireless (communication enabled at S1-1), the electric vehicle outputs vehicle information to the control unit 12 (S1-2). When the vehicle information is input from the electric vehicle to the control unit 12, the control unit 12 determines a charging standard of the charging connector(s) 13-1 to 13-3 to be unlocked on the basis of the input vehicle information (S3-6). The processing from determination of "new" at S3-4 to determination of a charging standard at S3-6 corresponds to the second determination processing and corresponds to the second determination step of the charging start control method.

Additionally, the control unit 12 having made a determination of "existing" at S3-4 determines a charging standard of the charging connector(s) 13-1 to 13-3 to be unlocked on the basis of the vehicle information acquired from the data base 20 (S3-6). This processing corresponds to the first determination processing and corresponds to the first determination step of the charging start control method.

The control unit 12 having made a determination of the charging standard causes the input receiving means 16 to display a screen for selecting whether change of the vehicle information is needed or not (selection processing). When the user selects "change needed" in the input receiving means 16 (change needed at S2-4), the control unit 12 executes the second determination processing. As a result, even when vehicle information stored in the data base 20 and vehicle information related to a user's current electric vehicle are different from each other, such as a case where even though a vehicle is changed, vehicle information stored in the data base 20 is yet to be updated, the control unit 12 is allowed to acquire vehicle information related to the user's current electric vehicle to make proper determination of a charging standard.

On the other hand, when the user selects "change unneeded" in the input receiving means 16 (change unneeded at S2-4), the charging connector(s) 13-1 to 13-3 compliant with the determined charging standard is/are unlocked, and for allowing the user to identify the unlocked charging connector(s) 13-1 to 13-3, the lighting means 15-1 to 15-3 give a notification of unlocking (S3-7). For example, when the determined charging standard is the first charging standard A, the charging connectors 13-1 and 13-2 are unlocked and the lighting means 15-1 and 15-2 light. However, when the charging connector 13-2 is in use (connected to another electric vehicle), since the charging connector 13-2 is not unlocked, the lighting means 15-2 does not light and only the lighting means 15-1 lights. On the other hand, when the determined charging standard is the second charging standard B, the charging connector 13-3 is unlocked and the lighting means 15-3 lights. The processing of S3-7 corresponds to the unlocking/notification processing and corresponds to the unlocking/notification step of the charging start control method. Additionally, the control unit 12 may set a charging pattern together with the unlocking/notification processing and cause the input receiving means 16 to display information related to the charging pattern (e.g. a charging time, a condition of power use etc.).

When unlocking and an unlocking notification are made by the control unit 12, as shown in FIG. 5, the user is allowed to connect the electric vehicle to the unlocked charging connector(s) 13-1 to 13-3 (S2-5). Specifically, when the determined charging standard is the first charging standard A, the charging connectors 13-1 and 13-2 can be connected to the electric vehicle, while when the determined charging standard is the second charging standard B, the charging connector 13-3 can be connected to the electric vehicle. In the following, it is assumed that the user connects the charging connector 13-1 compliant with the first charging standard A to the electric vehicle.

When a charging start button provided in the charging apparatus 10 is pressed by the user (S2-6), the control unit 12 causes the lighting means 15-1 and 15-2 compliant with the first charging standard A to light-off, while notifying the data base 20 of an update of the vehicle information (S3-8). A notification of an update of vehicle information includes a notification to an effect that the vehicle information is to be updated or newly stored when the second determination processing is executed, or a notification to an effect that no vehicle information is to be updated when the second determination processing is not executed. The data base 20 having received the vehicle information update notification enters an update waiting state (S4-3).

The control unit 12 having made a vehicle information update notification starts preparing for charging (S3-9, S1-3). Preparation for charging includes confirmation that communication between the charging apparatus 10 and the electric vehicle is normally conducted, confirmation that the charging connector 13-1 is locked in the electric vehicle, insulation check of the charging connector 13-1, and the like.

When the charging preparation is normally completed, the control unit 12 causes the power supply unit 11 to start charging operation, as well as notifying the input receiving means 16 and the data base 20 of the charging start (S3-10, S1-4). The input receiving means 16 having received the charging start notification displays a screen indicating that charging is started. This enables the user to confirm that charging is started (S2-7).

After a lapse of a predetermined time after entering the update waiting state, the data base 20 determines whether the charging start notification has been received or not (S4-4). When having received the charging start notification within the predetermined time, the data base 20 determines that a "notification" has been received to finalize the update of the vehicle information (S4-5). Specifically, when receiving a notification to an effect that vehicle information is to be updated or newly stored as an update notification, the data base 20 updates or newly stores the vehicle information and when receiving a notification to an effect that no vehicle information is to be updated, fails to update the vehicle information. By contrast, when receiving no charging start notification within the predetermined time, the data base 20 determines that "no notification" is received to cancel the update of the vehicle information (S4-6).

Reasons why a charging start notification has not been received within the predetermined time include, for example, abnormality of a charging function itself and temporary abnormality, cut-off or the like of a communication path. In the former case, no charging is started and an update of the vehicle information remains cancelled. On the other hand, in the latter case, since charging is started after preparing for the charging, the charging function itself has no abnormality, so that charging is continued to update the cancelled vehicle information after completion of the charging. Thus, by finalizing an update according to whether a charging start notification is received or not after a lapse of a predetermined time after the data base 20 receives an update notification (after entering the update waiting state), vehicle information can be updated early without waiting for completion of charging.

When the charging apparatus 10 starts charging and the data base 20 conducts the processing of S4-5 or the processing of S4-6, the charging start control method according to the present embodiment ends. Although the processing of S4-5 or the processing of S4-6 is preferably conducted after the charging start, it may be conducted before the charging start.

In conclusion, the charging start control method according to the present embodiment eliminates such inconvenience as a failure of charging because of user's erroneous selection of a charging standard because the charging apparatus 10 determines a charging standard on the basis of the vehicle information. Additionally, because the charging apparatus 10 gives a notification of unlocking by the lighting means 15-1 to 15-3 to allow a user to identify which of the charging connectors 13-1 to 13-3 is unlocked, the charging start control method according to the present embodiment eliminates such inconvenience as prevents the user from finding which of the charging connectors 13-1 to 13-3 is unlocked and further prevents excessive pull-out of the charging connectors 13-1 to 13-3 which is a cause of a failure.

Although in the foregoing, the description has been made of the embodiment of the charging system and the charging start control method of the charging system according to the present invention, the present invention is not limited to the above embodiment.

For example, while the charging apparatus 10 includes two charging connectors 13-1 and 13-2 compliant with the first charging standard A and one charging connector 13-3 compliant with the second charging standard B, the apparatus can be made to comply with three or more charging standards. Additionally, although the number of charging connectors compliant with each charging standard is at least one, providing a plurality of charging connectors enables an operating rate of the charging apparatus to be increased.

Although in the charging system 1, the data base 20 is configured to enable vehicle information to be sequentially updated or newly stored sequentially (see S4-5 in FIG. 5), an update or new storage of vehicle information may be inhibited to allow only a user corresponding to identification information stored in advance (only a user registered in a white list of the data base 20) to conduct charging, or charging by a user corresponding to specific identification information stored in advance (a user registered in a black list of the data base 20) may be inhibited.

In the charging apparatus 10, in place of an unlocking notification made by the lighting means 15-1 to 15-3, the input receiving means 16 may make a notification of unlocking by characters and/or voice. In this case, for example, a position or a number of the unlocked charging connector(s) 13-1 to 13-3 may be notified.

The charging system 1 may include a portable information terminal (e.g. a smart phone) that a user carries. In this case, the control unit 12 can be configured to receive an input of identification information and/or vehicle information from the portable information terminal and notify the portable information terminal of unlocking. The notification of unlocking is made by characters and/or voice. Specifically, in this case, the portable information terminal replaces the input receiving means 16 and the lighting means 15-1 to 15-3.

The charging system 1 may include a vehicle-mounted information terminal having a radio communication function (e.g. a car navigation system) mounted on a user's electric vehicle. In this case, the control unit 12 can be configured to receive an input of identification information and/or vehicle information from the vehicle-mounted information terminal and notify the vehicle-mounted information terminal of unlocking. The notification of unlocking is made by characters and/or voice. Specifically, in this case, the vehicle-mounted information terminal replaces the input receiving means 16 and the lighting means 15-1 to 15-3.

DESCRIPTION OF REFERENCE SIGNS

1 charging system
2 alternating current source
10, 10' charging apparatus
11 power supply unit
12 control unit
13-1, 13-2 charging connector compliant with first charging standard
13-3 charging connector compliant with second charging standard
14-1 to 14-3 locking mechanism 15-1 to 15-3 lighting means
16 input receiving means
17-1 to 17-3 relay
20 data base

The invention claimed is:

1. A charging system comprising a charging apparatus which charges a plurality of electric vehicles compliant with different charging standards, and a data base in which identification information for identifying a user of said charging apparatus and vehicle information related to an electric vehicle of the user are stored so as to be associated with each other, wherein
said charging apparatus comprises:
a charging apparatus main body including a power supply unit and a control unit, said power supply unit conducting a charging operation under the control of said control unit for charging an electric vehicle of the plurality of vehicles compliant with different charging standards; and
a plurality of charging connectors compliant with different charging standards which are switched between a state of being locked in said charging apparatus main body at a time of not conducting the charging operation and an unlocked state under the control of said control unit to permit conducting the charging operation,
said control unit executing:
reception processing of receiving an input of said identification information from a user; authentication processing of communicating with said data base to conduct authentication of said identification information input in said reception processing;
first determination processing of determining a charging standard on the basis of said vehicle information associated with said identification information when said authentication succeeds; and
unlocking/notification processing of unlocking a charging connector compliant with a charging standard determined by said first determination processing among said plurality of charging connectors and notifying of unlocking so as to allow the user to identify the unlocked charging connector to indicate that the unlocked charging connector is compliant with a charging standard that enables the charging operation to be performed with the electric vehicle of the user.

2. The charging system according to claim 1, wherein said control unit
executes second determination processing of receiving an input of said vehicle information from a user and determining a charging standard on the basis of said vehicle information input when said authentication fails in said authentication processing, and
in said unlocking/notification processing, unlocks a charging connector compliant with a charging standard determined by said first determination processing or by said second determination processing among said plurality of charging connectors, and notifies of unlocking so as to allow the user to identify the unlocked charging connector.

3. The charging system according to claim 2, wherein in said second determination processing, said control unit acquires said vehicle information by communication with a user's electric vehicle or acquires said vehicle information by notifying the user of the vehicle information of each of the plurality of electric vehicles to cause the user to select one from said vehicle information.

4. The charging system according to claim 2, wherein said control unit
executes selection processing of causing a user to select a need of change/no need of change of said vehicle information acquired in said first determination processing or in said second determination processing, and
when the user selects no need of change, notifies said data base of an update of said vehicle information and when the user selects a need of change, executes said second determination processing.

5. The charging system according to claim 4, wherein when causing said power supply unit to start said charging operation, said control unit notifies said data base of a charging start, and
when receiving said update notification and said charging start notification from said control unit, said data base updates said vehicle information associated with said identification information or stores said vehicle information notified so as to be associated with said identification information.

6. The charging system according to claim 2, wherein said charging apparatus comprises:
input receiving means which receives an input of said identification information and said vehicle information from a user and outputs said input identification information and said input vehicle information to said control unit; and
lighting means which lights under the control of said control unit for allowing the user to visually identify said charging connector unlocked.

7. The charging system according to claim 2, further comprising a portable information terminal which a user carries,
wherein said control unit receives an input of said identification information and/or said vehicle information from said portable information terminal to notify said portable information terminal of said unlocking.

8. The charging system according to claim 2, further comprising a vehicle-mounted information terminal mounted on a user's electric vehicle,
wherein said control unit receives an input of said identification information and/or said vehicle information from said vehicle-mounted information terminal to notify said vehicle-mounted information terminal of said unlocking.

9. The charging system according to claim 2, wherein said plurality of charging connectors includes a plurality of charging connectors for one charging standard, and
in said unlocking/notification processing, said control unit unlocks the plurality of charging connectors compliant with a charging standard determined by said first determination processing or by said second determination processing.

10. A charging start control method of a charging system including a charging apparatus having a plurality of charging connectors compliant with different charging standards to charge a plurality of electric vehicles compliant with different charging standards, and a data base in which identification information for identifying a user of said charging apparatus and vehicle information related to an electric vehicle of the user are stored so as to be associated with each other, the method comprising steps, which are conducted by said charging apparatus, of:
a reception step of receiving an input of said identification information from a user;

an authentication step of communicating with said database to conduct authentication of said identification information input in said reception step;

a first determination step of determining a charging standard on the basis of said vehicle information associated with said identification information when said authentication succeeds; and an unlocking/notification step of switching a charging connector compliant with a charging standard determined by said first determination step among said plurality of charging connectors from a locked state to an unlocked state and notifying of unlocking so as to allow the user to identify the unlocked charging connector.

11. The charging start control method according to claim 10, further comprising a second determination step, which is conducted by said charging apparatus, of receiving an input of said vehicle information from a user and determining a charging standard on the basis of said vehicle information input when said authentication fails in said authentication step, wherein in said unlocking/notification step, said charging apparatus switches a charging connector compliant with a charging standard determined by said first determination step or by said second determination step among said plurality of charging connectors from the locked state to the unlocked state and notifies of unlocking so as to allow the user to identify the unlocked charging connector.

* * * * *